US010145520B1

(12) United States Patent
Tang

(10) Patent No.: US 10,145,520 B1
(45) Date of Patent: Dec. 4, 2018

(54) LIGHT ASSEMBLY

(71) Applicant: Yi-Wen Tang, Taichung (TW)

(72) Inventor: Yi-Wen Tang, Taichung (TW)

( * ) Notice: Subject to any disclaimer, the term of this patent is extended or adjusted under 35 U.S.C. 154(b) by 0 days.

(21) Appl. No.: 15/721,974

(22) Filed: Oct. 2, 2017

(51) Int. Cl.
| | |
|---|---|
| *F21S 4/10* | (2016.01) |
| *F21V 15/01* | (2006.01) |
| *H05B 37/02* | (2006.01) |
| *F21S 4/00* | (2016.01) |
| *F21V 21/00* | (2006.01) |

(52) U.S. Cl.
CPC .............. *F21S 4/10* (2016.01); *F21V 15/01* (2013.01); *H05B 37/0218* (2013.01)

(58) Field of Classification Search
CPC ......... H05B 37/0218; F21V 15/01; F21S 4/10
See application file for complete search history.

(56) References Cited

U.S. PATENT DOCUMENTS

| | | | | |
|---|---|---|---|---|
| 2004/0115984 A1* | 6/2004 | Rudy | ................... | F21V 21/002 439/405 |
| 2007/0247868 A1* | 10/2007 | Li | ....................... | H05B 37/036 362/565 |
| 2008/0094828 A1* | 4/2008 | Shao | ....................... | F21K 9/00 362/219 |
| 2008/0298064 A1* | 12/2008 | Cheng | .................... | F21V 17/06 362/249.07 |
| 2010/0000065 A1* | 1/2010 | Cheng | .................... | A47G 33/06 29/428 |

* cited by examiner

*Primary Examiner* — Thien T Mai

(57) ABSTRACT

A light assembly includes at least one power pack, multiple wire units, multiple connection parts and multiple light units. The at least one power pack includes a first sensor and a first locking portion. The wire units each have a first wire and two second connectors. A second connection portion is connected to each of two ends of the first wire, and connected to the first connection portion. The second connectors each are threadedly connected to the first locking portion. Each connection part is between the two wire units. The connection parts each have at least three third connection portions which are connected to the second connectors. The multiple light units are respectively connected to the multiple connection parts. The light units each include a fourth connector and a light part which is connected to the third connection portion by the second wire.

12 Claims, 14 Drawing Sheets

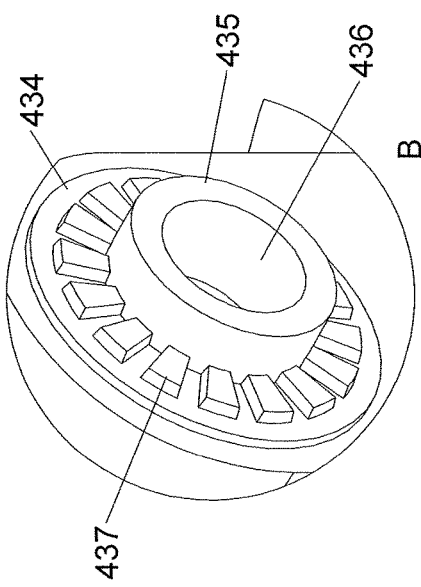
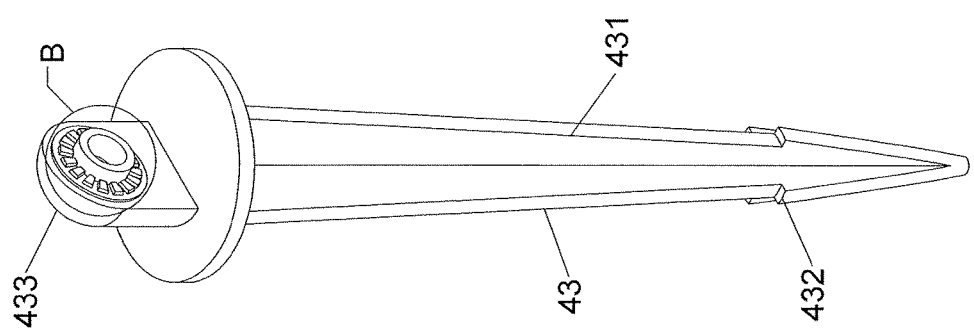

LIGHT ASSEMBLY

BACKGROUND OF THE INVENTION

1. Fields of the Invention

The present invention relates to a light assembly, and more particularly, to an expandable light assembly that can be connected with multiple light units.

2. Descriptions of Related Art

The conventional light assembly known to applicant includes a wire connected with a power cable and multiple light units. There are multiple first connection portions and multiple second connection portions that can be quickly connected to or dis-connected from the first connection portions. The multiple wire can be connected with multiple first and second connection portions to increase the total length thereof. The power cable has one end thereof connected with a third connection portion which is connected with the second connection portions, and the other end of the power cable is connected with the power source. The light units each have a case and an LED light bulb whose two legs are respectively connected to the fourth connection portion by wires. The shortcomings of the conventional light assembly is that the wire has multiple first and second connection portions, and the second connection portion is connected with the first connection portion. The power cable has one end thereof connected to the third connection portion which is connected with the second connection portion. However, each wire can only be connected with on second connection portion. Every two of the wires are connected by connecting the second connection portion of one wire with another first connection portion of another wire. In other words, multiple wires are needed to be connected with one power cable The present invention intends to provide a light assembly which is expandable to be connected with more light units.

SUMMARY OF THE INVENTION

The present invention relates to a light assembly and comprises at least one power pack, multiple wire units, multiple connection parts and multiple light units. The at least one power pack includes a first sensor and a first locking portion. The wire units each have a first wire and two second connectors. A second connection portion is connected to each of two ends of the first wire, and connected to the first connection portion. The second connectors each are threadedly connected to the first locking portion. Each connection part is between the two wire units. The connection parts each have at least three third connection portions which are connected to the second connectors. The multiple light units are respectively connected to the multiple connection parts. The light units each include a fourth connector and a light part which is connected to the third connection portion by the second wire.

The present invention has wire units and connection parts which are connected to the wire units, and multiple light units and at least one power pack. The present invention can be expanded to be connected with more light units when compared with the conventional light assembly.

The present invention will become more apparent from the following description when taken in connection with the accompanying drawings which show, for purposes of illustration only, a preferred embodiment in accordance with the present invention.

BRIEF DESCRIPTION OF THE DRAWINGS

FIG. 6 is a perspective view to show the spike of the light assembly of the present invention;

FIG. 7 is an enlarged view of the circled "B" in FIG. 6;

DETAILED DESCRIPTION OF THE PREFERRED EMBODIMENT

Figure 1:
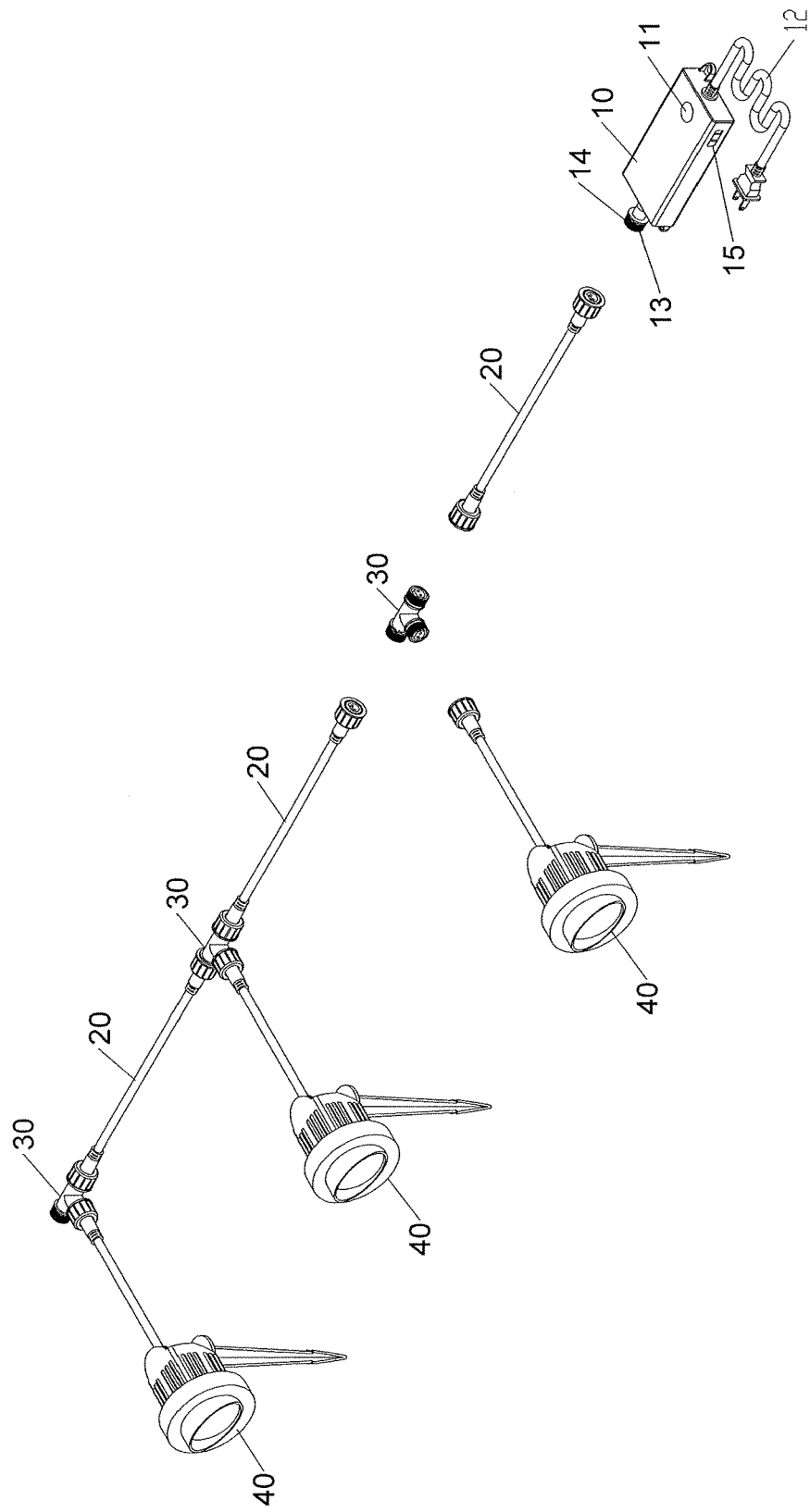
FIG. 1 is an exploded view of the light assembly of the present invention.

Referring to FIGS. 1 to 9, the light assembly of the present invention comprises at least one power pack 10 for providing power to the light assembly, multiple wire units 20, multiple connection parts 30 and multiple light units 40. The at least one power pack 10 has a first sensor 11 which senses the ambient light to control operation of the at least one power pack 10. The at least one power pack 10 has the first end thereof connected to a power cable 12 which is connected with a power source, and the second end of the at least one power pack 10 includes a first connection portion 13 which has two receptacle holes and a first locking portion 14 is formed on the outside thereof. The at least one power pack 10 has a first control portion 15 on one side thereof, and the first control portion 15 controls the time period of the operation of the at least one power pack 10. When the first sensor 11 senses that ambient light of the at least one power pack 10 is dim, the at least one power pack 10 outputs power to the light assembly. The first control portion 15 controls output-power period of the at least one power pack 10 is 4, 5, 6 or 8 hours.

Figure 2:
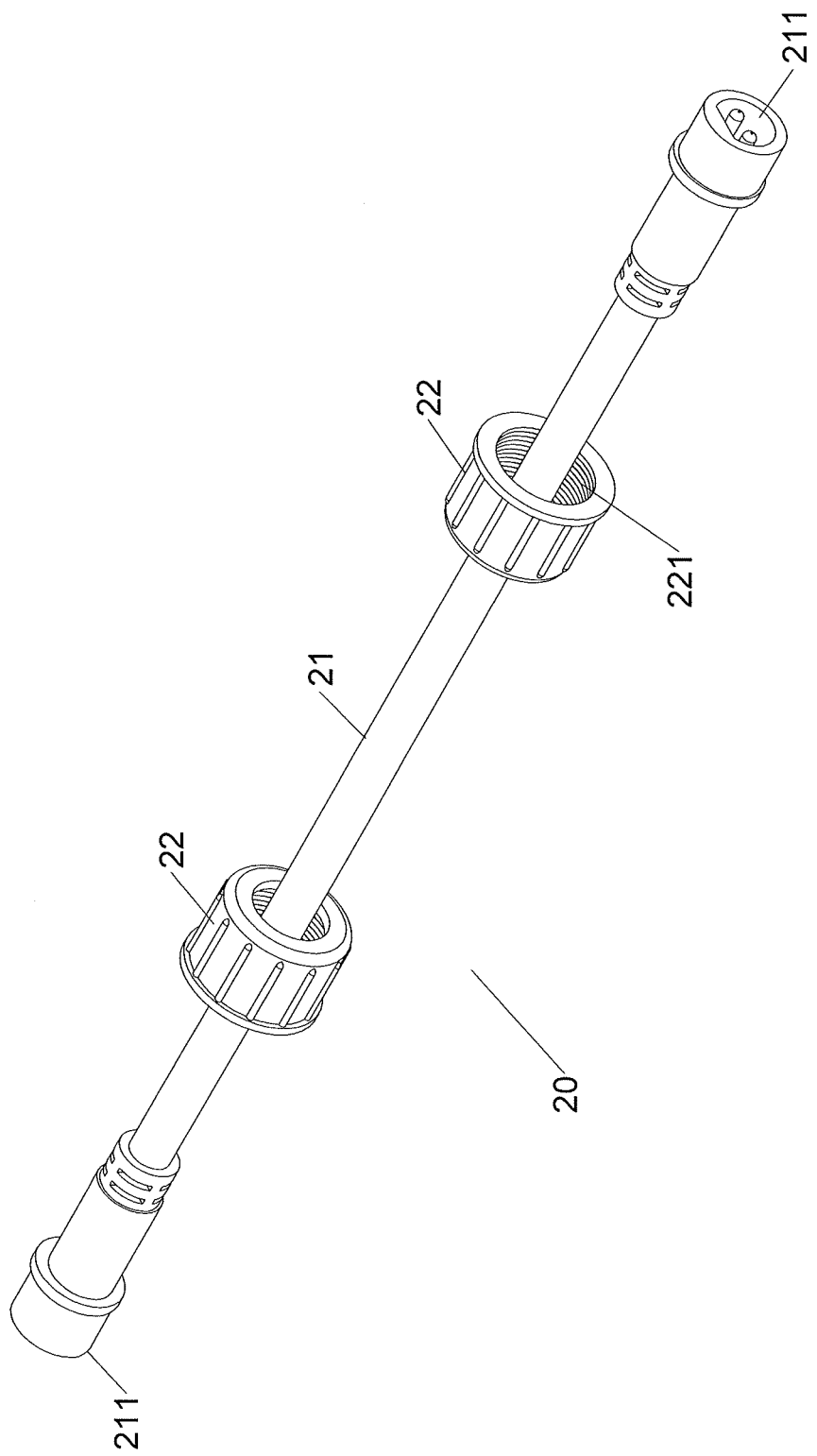
FIG. 2 is a perspective view to show the wire unit of the light assembly of the present invention.
Figure 3:
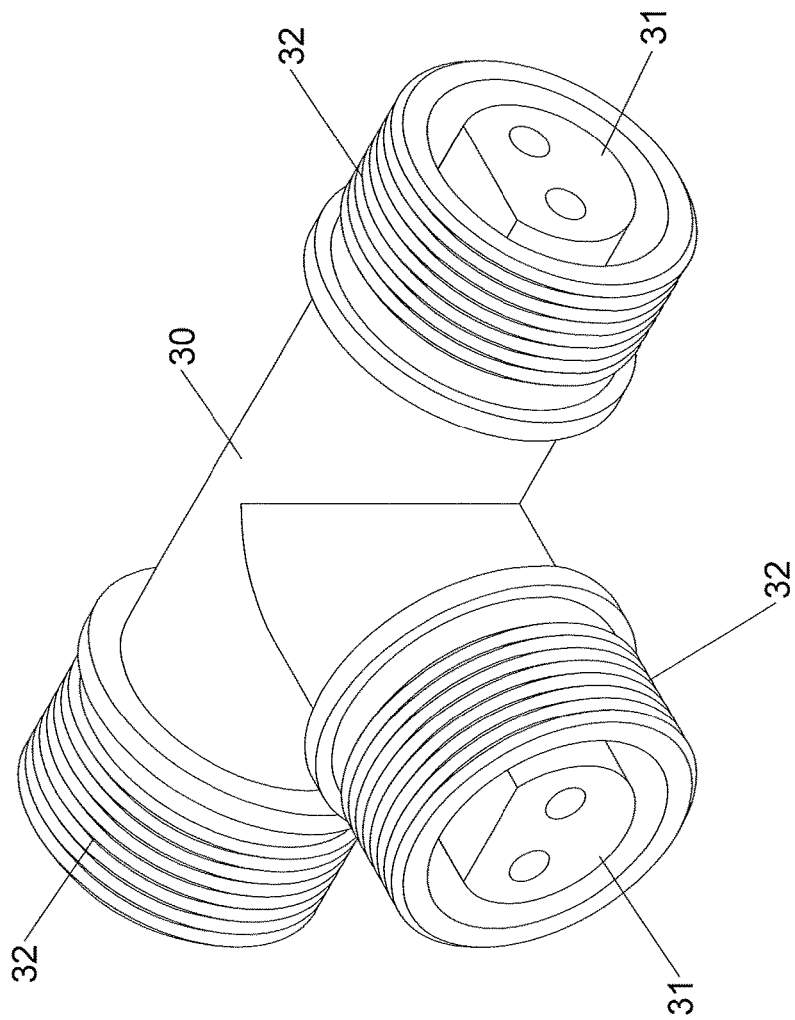
FIG. 3 is a perspective view to show the connection part of the light assembly of the present invention.
Figure 4:
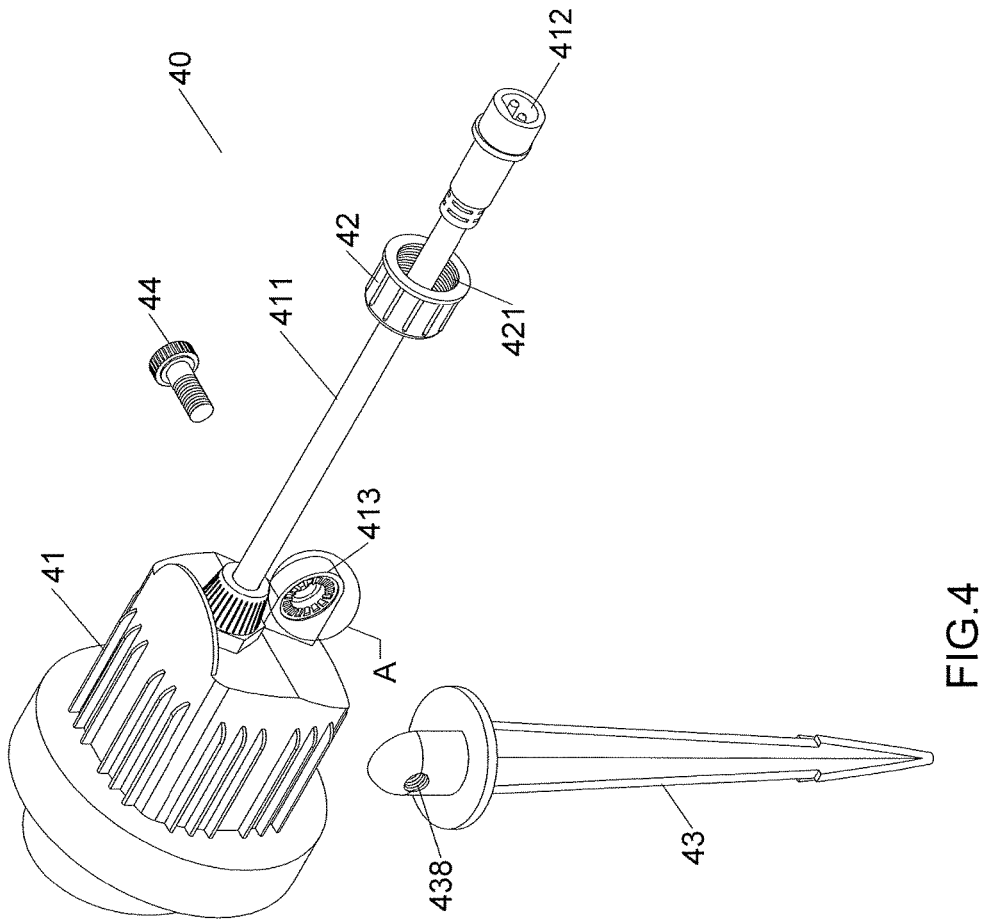
FIG. 4 is an exploded view of the light unit of the light assembly of the present invention.
Figure 5:
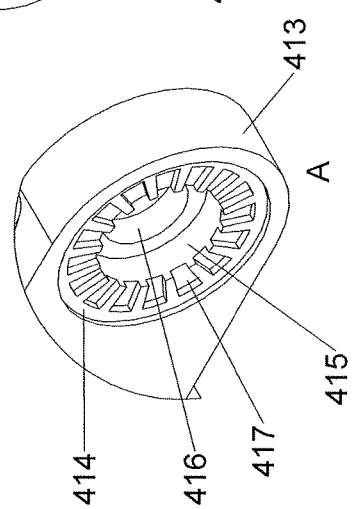
FIG. 5 is an enlarged view of the circled "A" in FIG. 4.
Figure 8:
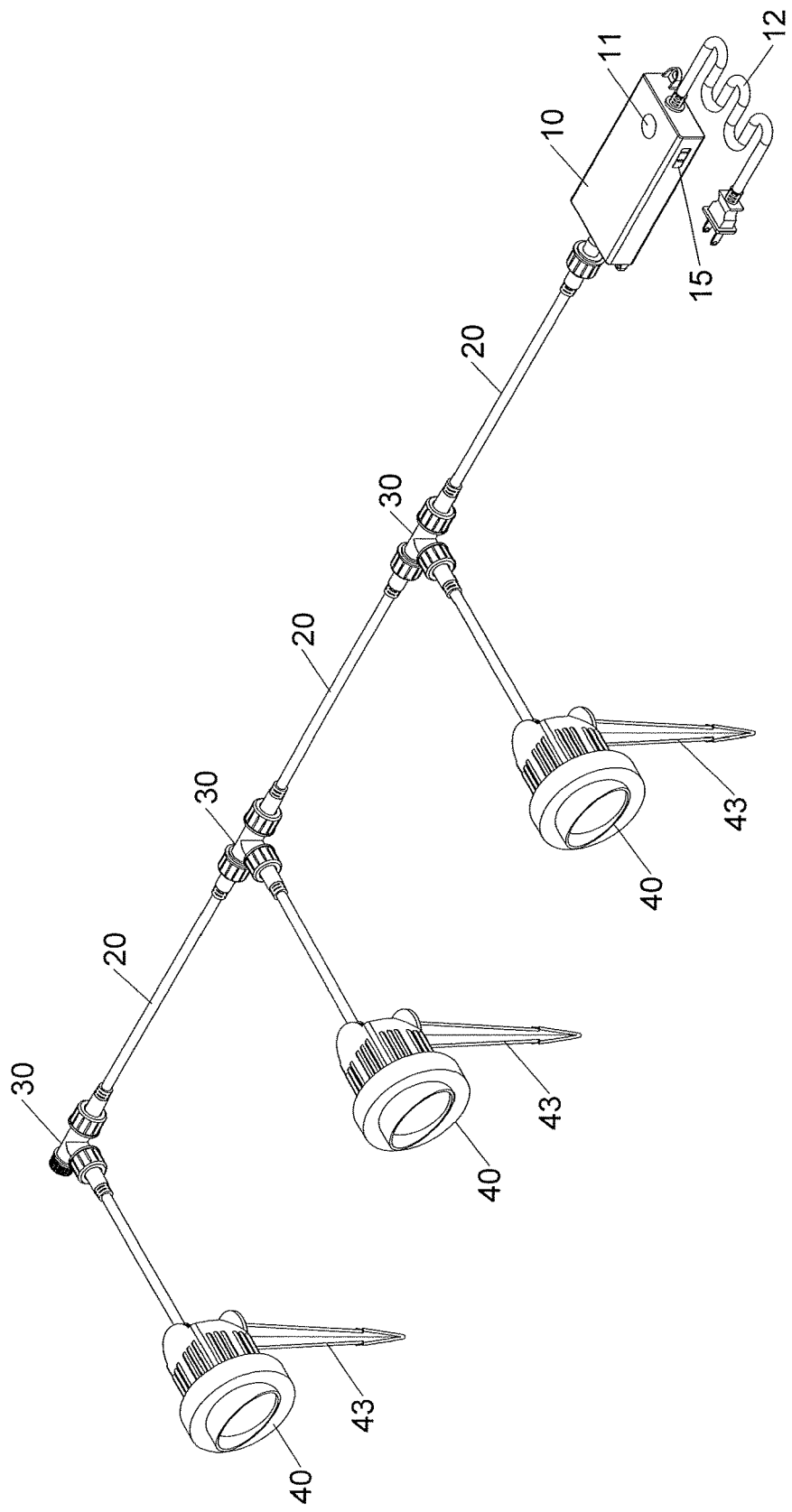
FIG. 8 is a perspective view to show the light assembly of the present invention.

As shown in FIG. 2, the multiple wire units 20 each have a first wire 21 and two second connectors 22. A second connection portion 211 is connected to each of two ends of the first wire 21, and connected to the first connection portion 13 to electrically connect the wire units 20 to the at least one power pack 10. Each of the second connectors 22 is rotatably mounted to outside of the second connection portion 211 corresponding thereto. The second connectors 22 each have a second locking portion 221 which is threadedly connected to the first locking portion 14 to hide and connect the first and second connection portions 13, 211 in the second connector 22.

The multiple connection parts 30 each are electrically connected between two wire units 20. Each connection part 30 has at least three third connection portions 31. The two third connection portions 31 on two ends of the connection part 30 are respectively connected to the second connection portions 211 of the wire unit 20. Each third connection portion 31 has an identical structure as the first connection portion 13. Each third connection portion 31 has a third locking portion 32 formed on outside thereof which is threadedly connected to the second locking portion 221 of the second connector 22 to hide and connect the second and third connection portions 211, 31 in the second connector 22. The third locking portion 32 has an identical structure as the first locking portion 14.

The multiple light units 40 respectively and electrically connected to the connection parts 30. Each light unit 40 has a light part 41, a fourth connector 42, a spike 43 and a bolt 44. The light part 41 electrically connected to the first end of a second wire 411, and the second end of the second wire 411 has a fourth connection portion 412 which is electrically connected to the third connection portion 31 to electrically connect the light unit 40 and the connection part 30. The fourth connection portion 412 having an identical structure as the second connection portion 211. The light parts 41 each have a pivotal part 413 which has a face 414 on one side thereof. The face 414 includes a recessed and circular recess 415 which is located at the center of multiple slots 417. A pivotal hole 416 is defined through the inner bottom of the recess 415. The diameter of the pivotal hole 416 is smaller than that of the recess 415. The fourth connector 42 is mounted to the outside of the fourth connection portion 412 and has a fourth locking portion 421 formed therein which is threadedly connected to the third locking portion 32 so as to hide and connect the third and fourth connection portions 31, 412 in the fourth connector 42. The fourth connector 42 has an identical structure as the second connector 22.

As shown in FIGS. 6 and 7, the spike 43 is connected to the light part 41 so as to be inserted into soil. The spike 43 includes a fixing portion 431 which is inserted into soil, and multiple hooks 432 protrudes from outside of the fixing portion 431 so as to secure the spike 43 in the soil. The spike 43 has a curved portion 433 on one end thereof. The curved portion 433 is pivotably connected to the pivotal part 413. The curved portion 433 has a face 434 on the first side thereof, and the face 434 is matched with the face 414. The face 434 includes multiple protrusions 437 and a tube 435 which is located at the center of the protrusions 437. The tube 435 is inserted into the recess 415 and includes a passage 436 which shares a common axis with the pivotal hole 416. A threaded hole 438 is defined in the second side of the face 434 and communicates with the passage 436. The bolt 44 extends through the pivotal hole 416, the passage 436 and is threadedly connected to the threaded hole 438 to engage the protrusions 437 with the slots 417.

Figure 9:
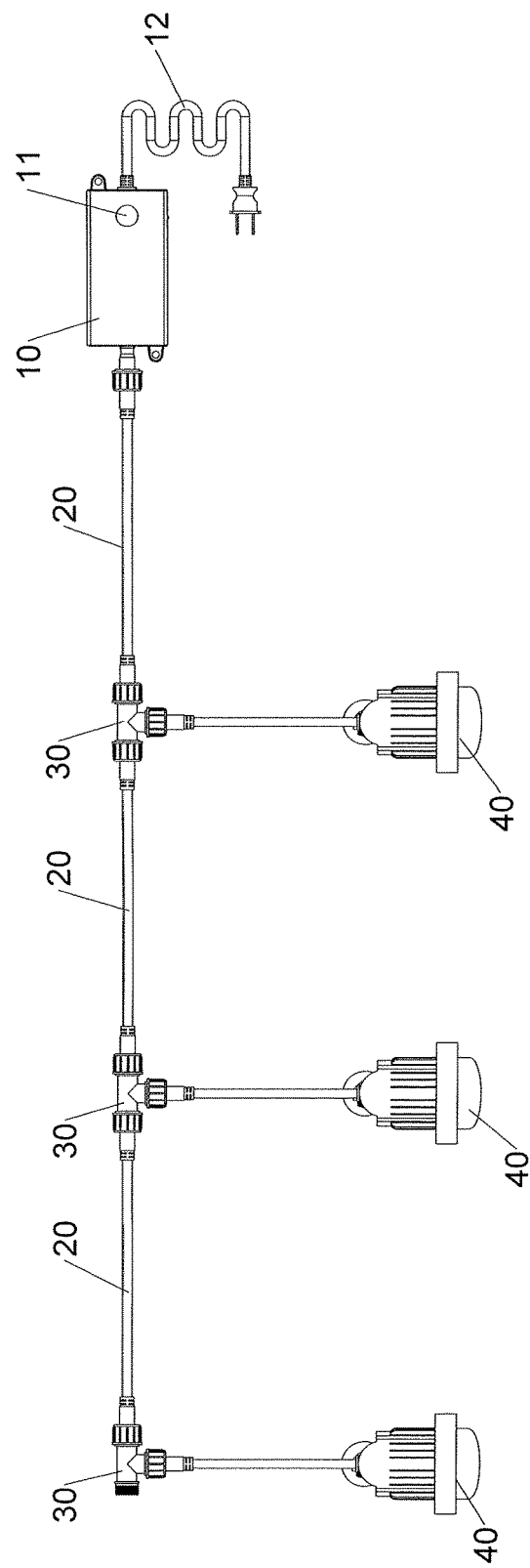
FIG. 9 is a top view to show the light assembly of the present invention.
Figure 10:
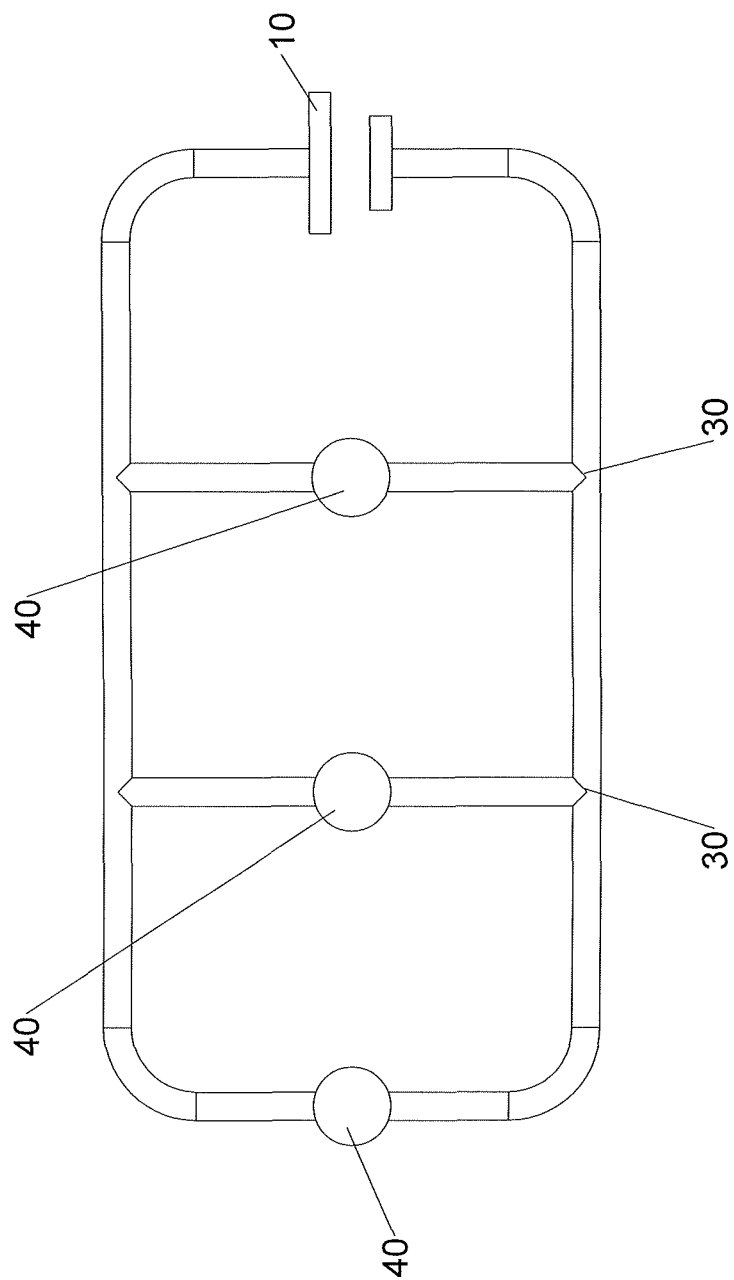
FIG. 10 illustrates the circuit of the light assembly of the present invention.
Figure 11:
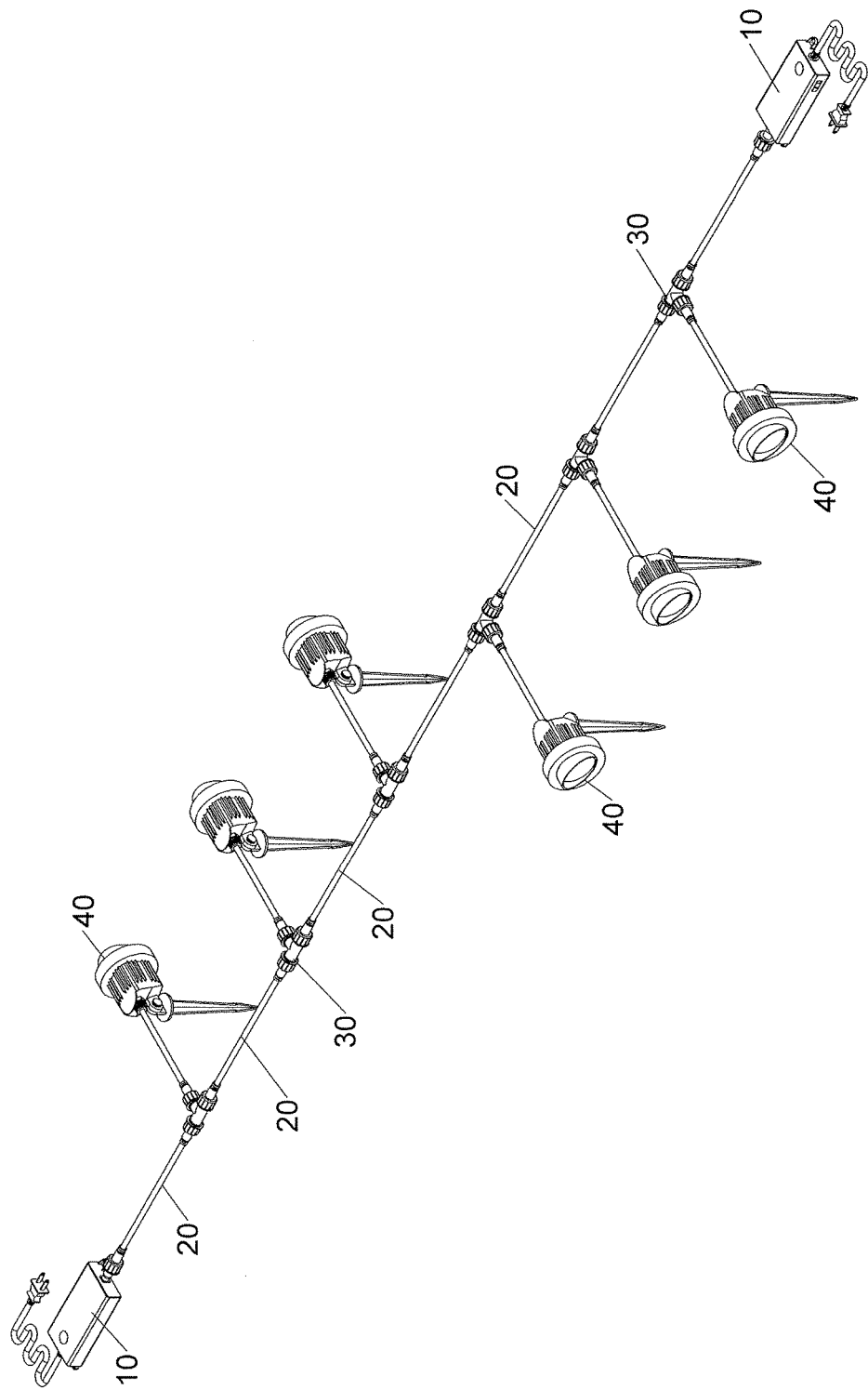
FIG. 11 is a perspective view to show the second embodiment of the light assembly of the present invention.

As shown in FIGS. 9 and 10, the light units 40 are electrically connected to each other in parallel. One of the wire units 20 is connected to the at least one power pack 10. A connection part 30 is connected between two wire units 20, and to one light unit 40. As shown in FIG. 11, the light assembly includes one power pack 10 on each of two ends thereof to provide power to multiple light assemblies, at least two of the multiple light units 40. By using the third connection portions 31, the light units 40 can be connected to different direction relative to the connection part 30.

Figure 12:
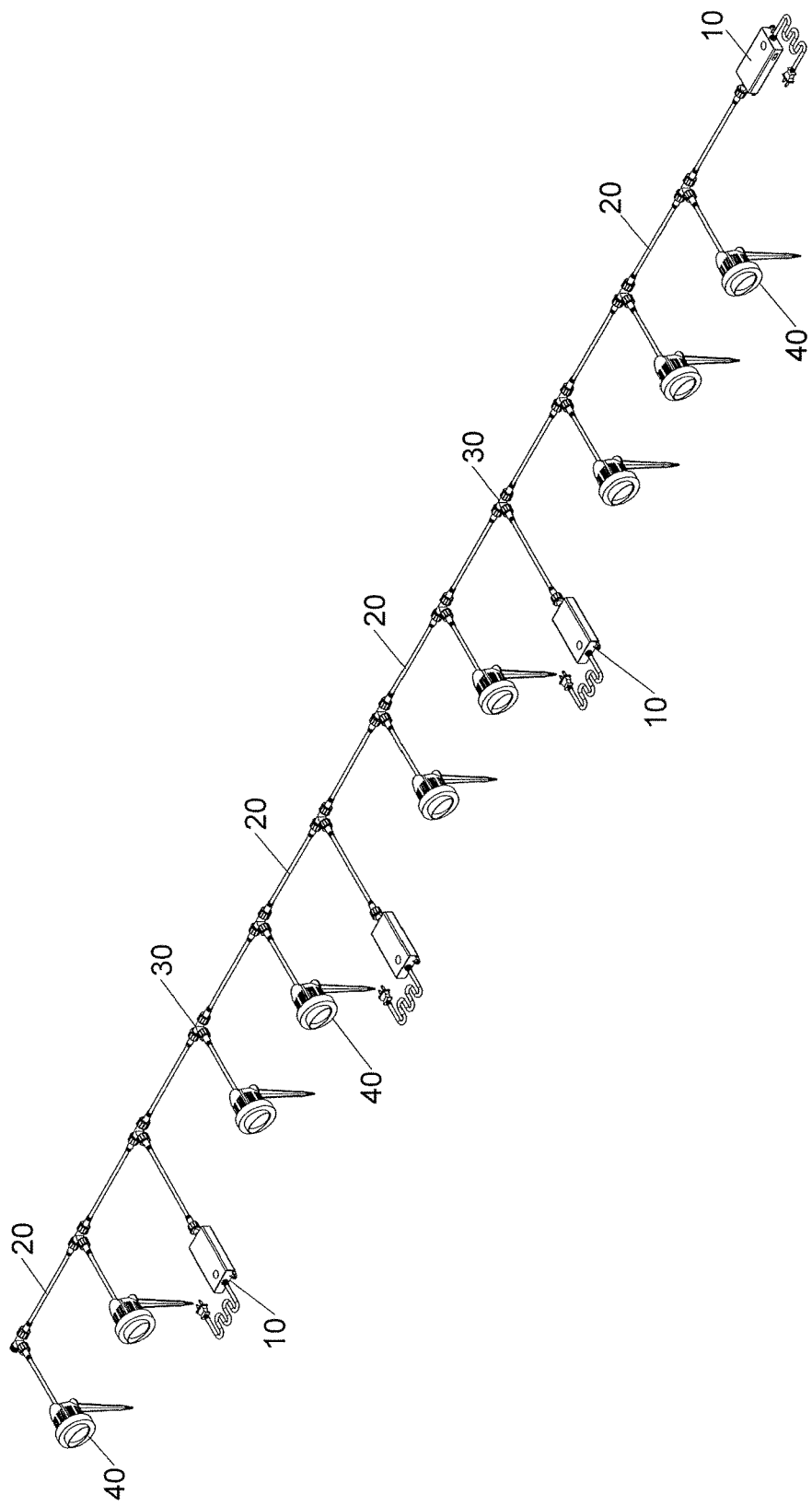
FIG. 12 is a perspective view to show the third embodiment of the light assembly of the present invention.

As shown in FIG. 12, multiple power packs 10 are provided to provide power to more light units 40.

Figure 13:
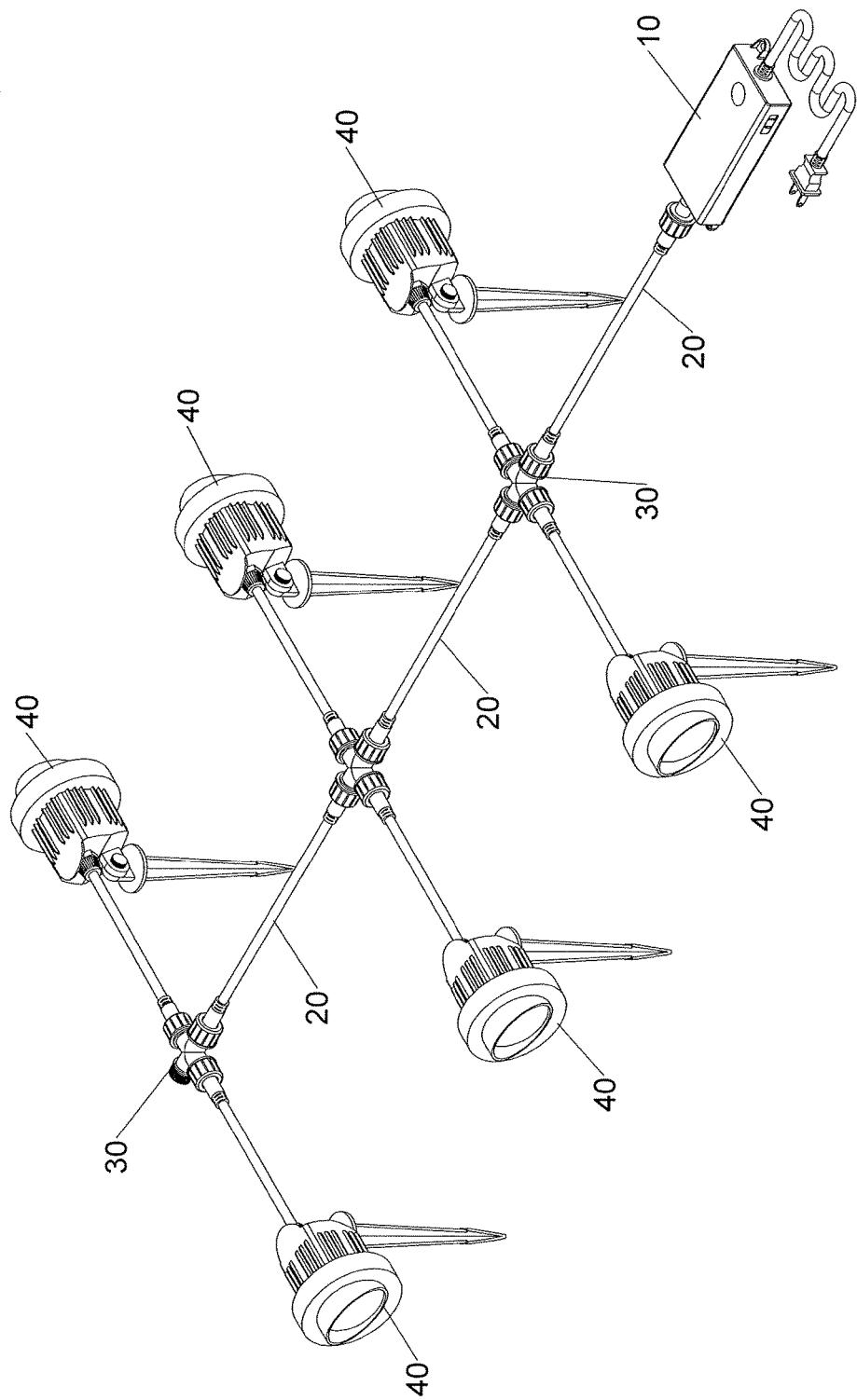
FIG. 13 is a perspective view to show the fourth embodiment of the light assembly of the present invention.
Figure 14:
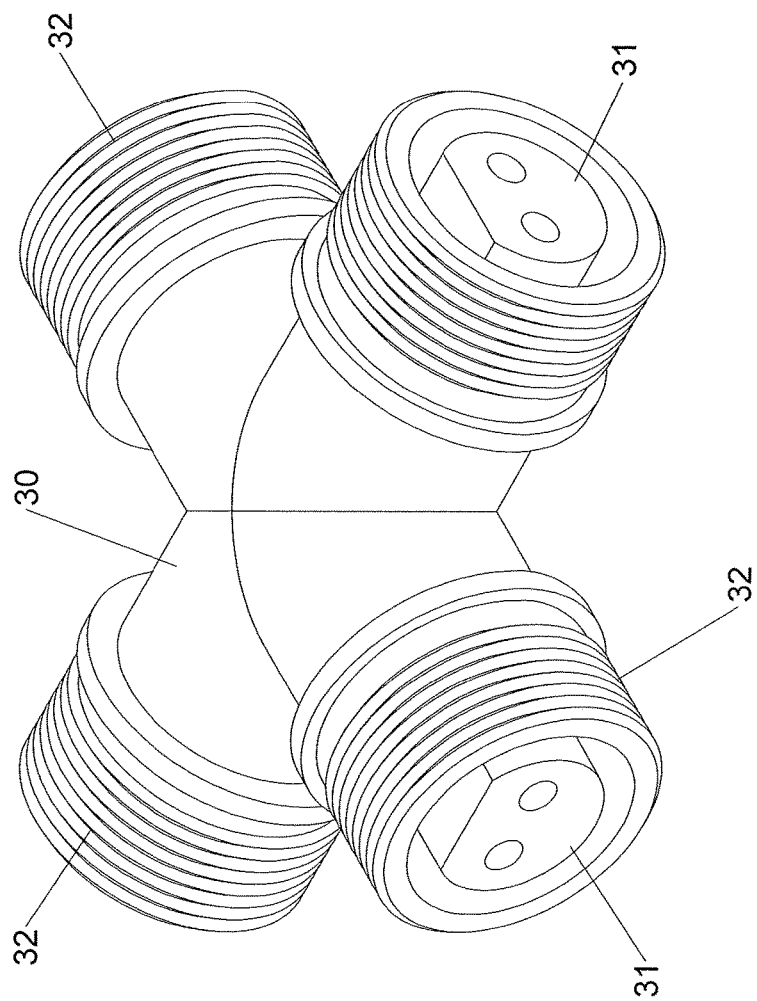
FIG. 14 is a perspective view to show the connection part of the fourth embodiment of the light assembly of the present invention.

As shown in FIGS. 13 and 14, the connection parts 30 each are a cross-shaped part and include four third connection portions 31. Two of the four third connection portions 31 are respectively connected to the two wire units 20, and the other two of the four third connection portions 31 are respectively connected to the two light units 40.

Figure 15:
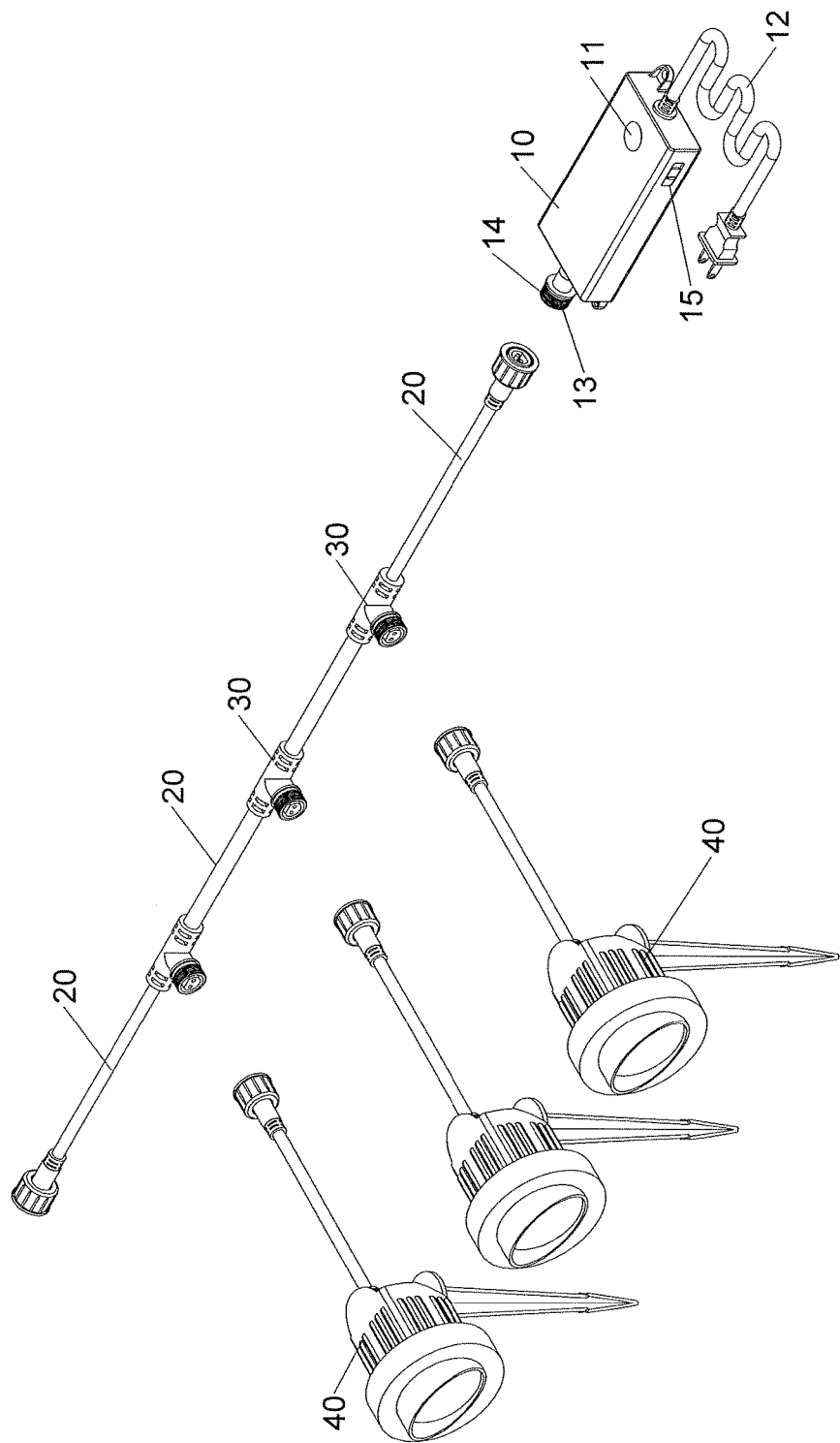
FIG. 15 is a perspective view to show the fifth embodiment of the light assembly of the present invention.

As shown in FIG. 15, the wire units 20 and the connection parts 30 are integrally formed as a one-piece.

Figure 16:
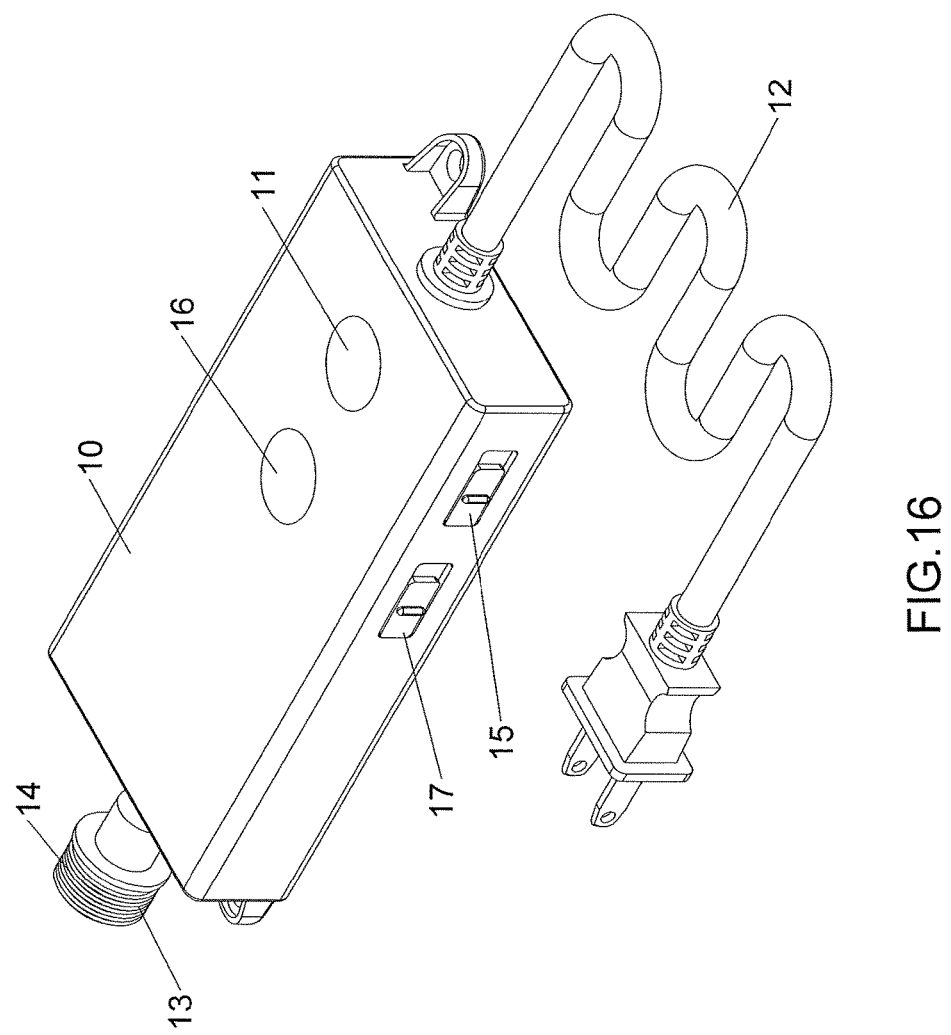
FIG. 16 is a perspective view to show the power pack of the sixth embodiment of the light assembly of the present invention.

As shown in FIG. 16, the at least one power pack 10 includes a second sensor 16 and a second control portion 17. When the at least one power pack 10 does not output power, and the ambient light is dim, as the second sensor 16 senses at least one moving object within a distance relative to the at least one power pack 10, the at least one power pack 10 begins to output power. The second control portion 17 controls output-power period of the at least one power pack 10 is 10, 15 or a longer period of time.

The advantages of the present invention are that the wire units 20 and the connection parts 30 can be connected to each other to expand the number of the light units 40.

The light assembly has one power pack 10 at each end thereof so as to be connected to more light units 40. By using the connection parts 30, the light units 40 can illuminate different directions as shown in FIG. 11.

More sets of the wire units 20 and the connection parts 30, and power packs 10 can be connected to more light units 40 as shown in FIGS. 1, 11, 12 and 13.

The pivotal part 413 of the light part 41 is pivotably connected to the curved portion 433 of the spike 43, so that the light part 41 is able to be set at a desired direction. The bolt 44 is connected with the threaded hole 438 to set the position of the light part 41 and adjust the illumination.

While we have shown and described the embodiment in accordance with the present invention, it should be clear to those skilled in the art that further embodiments may be made without departing from the scope of the present invention.

What is claimed is:

1. A light assembly comprising:

at least one power pack for providing power to the light assembly, the at least one power pack having a first sensor which is adapted to sense ambient light to control operation of the at least one power pack, the at least one power pack having a first end thereof connected to a power cable which is adapted to be connected with a power source, a second end of the at least one power pack including a first connection portion which has a first locking portion, the at least one power pack having a first control portion which controls a time period of the operation of the at least one power pack;

multiple wire units each having a first wire and two second connectors, a second connection portion connected to each of two ends of the first wire, and connected to the first connection portion to electrically connect the wire units to the at least one power pack, each of the second connectors mounted to outside of the second connection portion corresponding thereto, the second connectors each having a second locking portion which is threadedly connected to the first locking portion to hide and connect the first and second connection portions in the second connector;

multiple connection parts each electrically connected between two wire units, each connection part having at least three ends, each of the at least three ends having a third connection portion which has an identical structure as the first connection portion, each third connection portion having a third locking portion on outside thereof which is threadedly connected to the second locking portion of the second connector to hide and connect the second and third connection portions in the second connector, the third locking portion has an identical structure as the first locking portion, and multiple light units respectively and electrically connected to the connection parts, each light unit having a light part, a fourth connector and a spike, the light part electrically connected to a first end of a second wire, a second end of the second wire having a fourth connection portion which is electrically connected to the third connection portion to electrically connect the light unit and the connection part, the fourth connection portion having an identical structure as the second connection portion, the fourth connector mounted to outside of the fourth connection portion and having a fourth locking portion formed therein which is threadedly connected to the third locking portion so as to hide and connect the third and fourth connection portions in the fourth connector, the fourth connector having an identical structure as the second connector, the spike connected to the light part and adapted to be inserted into soil.

2. The light assembly as claimed in claim 1, wherein the first and second connection portions are electrically connected to each other, the second and third connection portions are electrically connected to each other, the third and fourth portions are electrically connected to each other.

3. The light assembly as claimed in claim 1, wherein when the first sensor senses that ambient light of the at least one power pack is dim, the at least one power pack outputs power to the light assembly, the first control portion controls output-power period of the at least one power pack is 4, 5, 6 or 8 hours.

4. The light assembly as claimed in claim 1, wherein there are three connection parts and each connection part is a T-shaped part, the two third connection portions on two ends of the connection part are respectively connected to the second connection portions of the wire unit.

5. The light assembly as claimed in claim 1, wherein the light parts each have a pivotal part which has a face on one side thereof, the face includes a recessed and circular recess which is located at a center of multiple slots, a pivotal hole is defined through an inner bottom of the recess, a diameter of the pivotal hole is smaller than that of the recess, the spike has a curved portion on one end thereof, the curved portion is pivotably connected to the pivotal part, the curved portion has a face on a first side thereof, the face contacts the face, the face includes multiple protrusions and a tube which is located at a center of the protrusions, the tube is inserted into the recess and includes a passage which shares a common axis with the pivotal hole, a threaded hole is defined in a second side of the face and communicates with the passage, a bolt extends through the pivotal hole, the passage and is threadedly connected to the threaded hole to engage the protrusions with the slots.

6. The light assembly as claimed in claim 1, wherein the spike includes a fixing portion which is adapted to be inserted into soil, multiple hooks protrudes from outside of the fixing portion.

7. The light assembly as claimed in claim 1, wherein the light units are electrically connected to each other in parallel.

8. The light assembly as claimed in claim 1, wherein the light assembly includes one power pack on each of two ends thereof to provide power to multiple light units, at least two of the multiple light units extend in different direction relative to the connection part.

9. The light assembly as claimed in claim 1, wherein the light assembly includes multiple power packs which are electrically and respectively connected to multiple connection parts to provide power to the light units.

10. The light assembly as claimed in claim 1, wherein the connection parts each are a cross-shaped part and include four third connection portions, two of the four third connection portions are respectively connected to the two wire units, the other two of the four third connection portions are respectively connected to the two light units.

11. The light assembly as claimed in claim 1, wherein the connection parts and the wire units connected to the connection parts are integrally formed as a one-piece.

12. The light assembly as claimed in claim 1, wherein the at least one power pack includes a second sensor and a second control portion, when the at least one power pack does not output power and the ambient light is dim, as the second sensor senses a moving object within a distance relative to the at least one power pack, the at least one power pack begins to output power, the second control portion controls output-power period of the at least one power pack is 10, 15 or a longer period of time.

* * * * *